(12) United States Patent
Manzoor et al.

(10) Patent No.: US 8,973,463 B2
(45) Date of Patent: Mar. 10, 2015

(54) RECESSED BELT DAMPER

(71) Applicant: Dayco IP Holdings, LLC, Springfield, MO (US)

(72) Inventors: Suhale Manzoor, Plymouth, MI (US); Bruce G. Christenson, Canton, MI (US)

(73) Assignee: Dayco IP Holdings, LLC, Springfield, MO (US)

( * ) Notice: Subject to any disclaimer, the term of this patent is extended or adjusted under 35 U.S.C. 154(b) by 0 days.

(21) Appl. No.: 13/676,895

(22) Filed: Nov. 14, 2012

(65) Prior Publication Data
US 2013/0068065 A1  Mar. 21, 2013

Related U.S. Application Data

(62) Division of application No. 11/770,085, filed on Jun. 28, 2007, now Pat. No. 8,342,058.

(51) Int. Cl.
F16F 15/126 (2006.01)
F16F 7/108 (2006.01)

(52) U.S. Cl.
CPC .............. *F16F 7/108* (2013.01); *F16F 15/126* (2013.01)
USPC .......................................... 74/574.4; 464/180

(58) Field of Classification Search
USPC ............... 74/574.4, 574.3; 464/180; 188/379; 267/141.2, 281; 29/451
See application file for complete search history.

(56) References Cited

U.S. PATENT DOCUMENTS

| | | | |
|---|---|---|---|
| 2,028,930 A | 1/1936 | Taylor | |
| 2,779,211 A | 1/1957 | Henrich | |
| 3,075,406 A * | 1/1963 | Butler, Jr. et al. | 74/574.4 |
| 3,479,907 A | 11/1969 | Hall | |
| 3,934,921 A | 1/1976 | Nelken | |
| 3,980,333 A | 9/1976 | Kasper et al. | |
| 3,986,747 A | 10/1976 | Raquet et al. | |
| 3,990,324 A | 11/1976 | Fishbaugh et al. | |
| 4,002,081 A | 1/1977 | Schultz, Jr. | |
| 4,050,665 A * | 9/1977 | Matthews et al. | 248/638 |
| 4,207,957 A | 6/1980 | Sivers et al. | |
| 4,888,539 A * | 12/1989 | Estabrook et al. | 318/685 |
| 5,058,267 A | 10/1991 | Andra et al. | |
| 5,140,868 A | 8/1992 | Mizuno et al. | |
| 5,288,059 A | 2/1994 | Gautheron et al. | |
| 5,540,626 A | 7/1996 | Asai et al. | |
| 6,171,194 B1 | 1/2001 | Haga et al. | |
| 6,312,340 B1 | 11/2001 | Gassen et al. | |
| 6,358,349 B1 | 3/2002 | Christenson et al. | |
| 6,386,065 B1 * | 5/2002 | Hodjat | 74/574.4 |
| 6,560,837 B1 | 5/2003 | Hodjat et al. | |

(Continued)

FOREIGN PATENT DOCUMENTS

| | | |
|---|---|---|
| DE | 1113367 B | 8/1961 |
| DE | 1178303 B | 9/1964 |

(Continued)

*Primary Examiner* — Thomas Diaz
(74) *Attorney, Agent, or Firm* — Thompson Hine LLP

(57) ABSTRACT

A torsional vibration damper includes an inertia mass and a rotating shaft or hub with an elastomeric ring between the inertia mass and the rotating shaft or hub. A large portion of said elastomeric member is located in a channel located either in the inertia mass or in the hub. This allows one to achieve high contact pressure without creating a significant fatigue on the elastomeric member. This can be used with either a crankshaft damper or an internal or external drive shaft damper.

4 Claims, 2 Drawing Sheets

(56) References Cited

U.S. PATENT DOCUMENTS

| | | |
|---|---|---|
| 6,725,985 B2 * | 4/2004 | Haneishi et al. .............. 188/379 |
| 6,736,246 B2 * | 5/2004 | Haneishi et al. .............. 188/379 |
| 6,837,345 B1 | 1/2005 | Lauble et al. |
| 7,044,276 B2 | 5/2006 | Haneishi et al. |
| 7,073,474 B2 | 7/2006 | Biel |
| 7,150,088 B2 | 12/2006 | Kano |
| 8,342,058 B2 | 1/2013 | Christenson et al. |
| 2005/0050985 A1 | 3/2005 | Crissy |

FOREIGN PATENT DOCUMENTS

| | | |
|---|---|---|
| DE | 1755860 A1 | 12/1971 |
| DE | 2747225 A1 | 4/1979 |
| DE | 3642418 A1 | 6/1987 |
| JP | 8233031 A | 9/1996 |
| JP | 08277885 A | 10/1996 |
| RU | 752072 | 7/1980 |

* cited by examiner ered absorbing material 50
RECESSED BELT DAMPER

RELATED APPLICATION

This application is related to and claims the benefit of U.S. patent application Ser. No. 11/770,085, filed Jun. 28, 2007, the disclosure of which is incorporated herein by reference.

FIELD OF THE INVENTION

The invention relates to torsional vibration dampers and, in particular, to vibration dampers adapted to be mounted to rotatable shafts such as the crankshaft or drive shaft of an internal combustion engine.

BACKGROUND OF THE INVENTION

Torsional vibration dampers are employed extensively in internal combustion engines to reduce torsional vibrations delivered to rotatable shafts. The torsional vibrations may have a considerable amplitude and, if not abated, can potentially damage gears or similar structures attached to the rotatable shaft and cause fatigue failure of the rotatable shaft. Torsional vibration dampers absorb vibration and, to a certain extent, reduce the amplitude of the vibrations by converting the vibrational energy to thermal energy as a result of the damping action. The absorption of the vibrational energy lowers the strength requirements of the rotatable shaft and, therefore, lowers the required weight of the shaft. The torsional vibration damper also has a direct effect on inhibiting vibration of nearby components of the internal combustion engine which would be affected by the vibration.

Virtually all motor vehicles with internal combustion engines incorporate a "serpentine" drive belt system consisting of a single endless drive belt and a series of pulleys. The pulleys derive power from the endless drive belt and operate to drive the various vehicle accessories such as the engine fan, power steering pump, air pumps, air conditioning unit, and the alternator. The endless drive belt that drives each of these pulleys is driven by a drive pulley connected to the crankshaft of the internal combustion engine. To reduce the transfer of vibrations between the crankshaft and the serpentine drive belt system, the drive pulley may comprise a torsional vibration damper that functions to reduce the amplitude or magnitude of the angular vibrations delivered by the crankshaft.

Torsional vibration dampers can also be fixed to a drive shaft. The vibration damper can be fixed either to the interior surface of a hollow drive shaft or the exterior surface of a drive shaft.

The torsional vibration dampers all include an inertia mass fixed to a rotating member with a vibration absorbing material between the inertia mass and the rotating member. This elastomeric member absorbs torsional vibration. Generally, the elastomeric member is in compression between the inertia mass and the rotating member. The compression provides the requisite slip torque. Unfortunately, the compression also creates significant strain on the elastomeric member.

Low strains on the elastomeric member lead to a better fatigue life, whereas high contact pressures lead to improve slip torque. Generally, dampers have been engineered to balance the strains and slip torque or contact pressure such that a relatively long fatigue life is achieved with a correspondingly acceptable slip torque.

SUMMARY OF THE INVENTION

The present invention is premised on the realization that a torsional vibration damper can be designed wherein relatively high slip torque or contact pressures can be achieved without creating high strains on the elastomeric member. The torsional vibrations of the present invention include a channel that receives a portion of the elastomeric member with a portion of the elastomeric member extending outside the channel. When the elastomeric member is partially contained in a channel and compressed, significant contact pressures can be achieved with relatively low strains and low compression. In a preferred embodiment, the elastomeric member is contained partially within a channel and compressed less than 10% to achieve the desired slip torque.

The present invention can be utilized to form either a crankshaft damper or a drive shaft damper designed to be located either inside or outside of the drive shaft.

The objects and advantages of the present invention will be further appreciated in light of the following detailed description and drawings in which:

DETAILED DESCRIPTION

Figure 1:
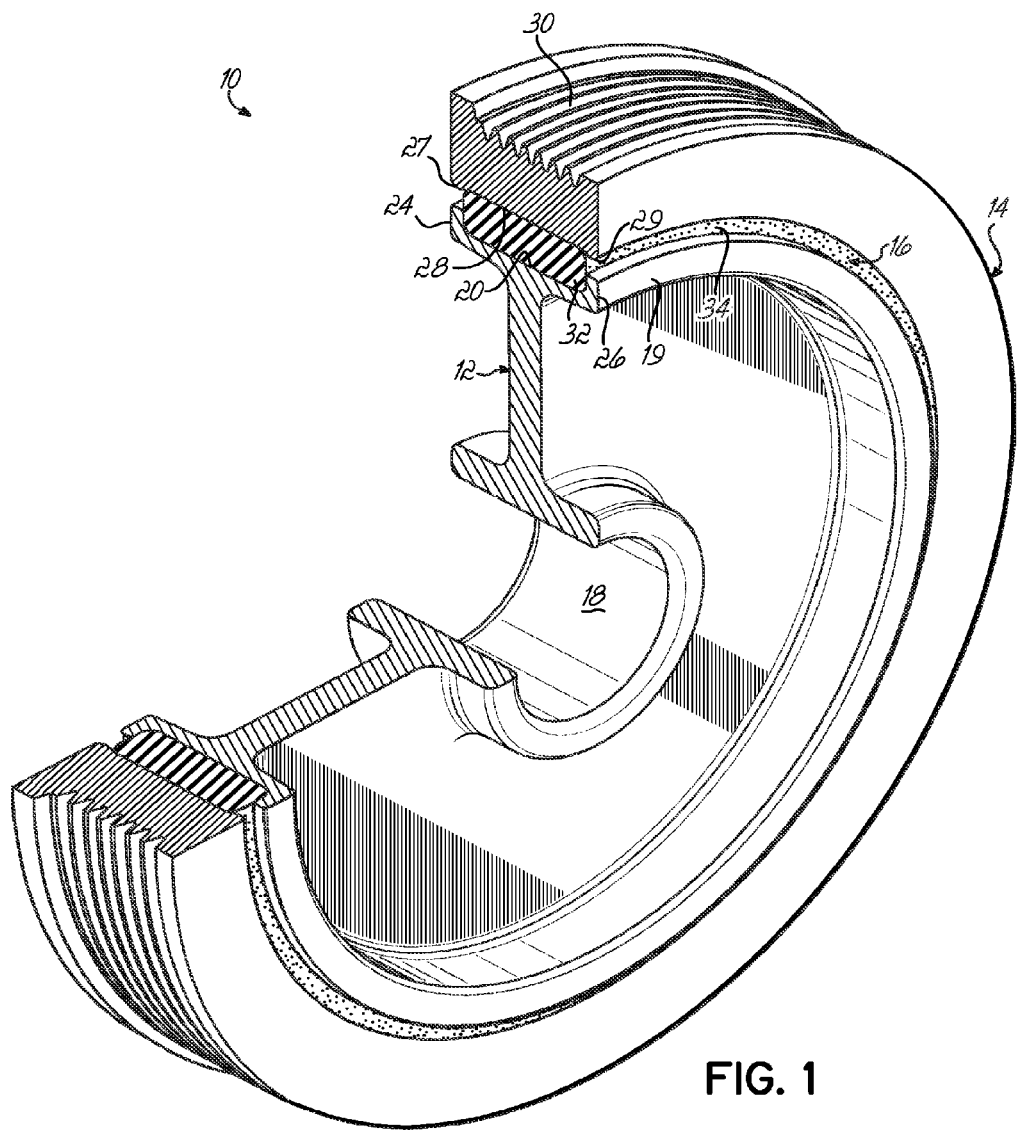
FIG. 1 is a perspective view broken away of the present invention.

As shown in FIG. 1, a crankshaft torsional vibration damper 10 includes a central hub member 12 and an annular inertia mass 14 separated by an elastomeric vibration absorbing member 16. This can be a continuous ring or an annular strip and is simply referred to as ring 16.

The central hub member 12 includes a central opening 18 which is adapted to attach to the crankshaft. Further, the hub member 12 includes a peripheral rim 19. The rim 19 includes a channel 20 having first and second side walls 24 and 26.

In turn, the inertia mass 14 has an interior annular surface 28 and an exterior surface 30. The exterior surface 30 in this embodiment is configured to engage a serpentine belt (not shown). However, in other embodiments a serpentine belt may not be employed. The side edges 27 and 29 of surface 28 are raised slightly about 0.5 mm, leaving a gap between the rim 19 and surface 28 of about 1.1 mm.

The elastomeric ring 16 includes a portion 32 which is located in channel 20 and a portion 34 located outside of channel 20. Preferably, the elastomeric ring 16 in a non-compressed state will fill the entire channel 20, extending from side wall 24 to side wall 26. Although a slight gap may be present, the gap must be totally filled when the damper is assembled. The ring can be continuous or formed from an elastomeric strip placed in channel 20.

Preferably, damper 10 is assembled by positioning the rubber ring or strip 16 within the channel 20 and forcing the mass 14 over the ring 16 forcing it into compression creating contact pressure between the mass 14 and the ring 16 and between ring 16 and the hub member 12, holding the assembly together.

Preferably, the compression required to assemble the damper should be less than 10%, preferably about 5 to 8%. This is designed to achieve a slip torque suitable for the particular application. Generally, the desired slip torque for a crankshaft damper will vary from about 600 to 2000 ft/lbs, again depending upon the desired application.

Figure 2:
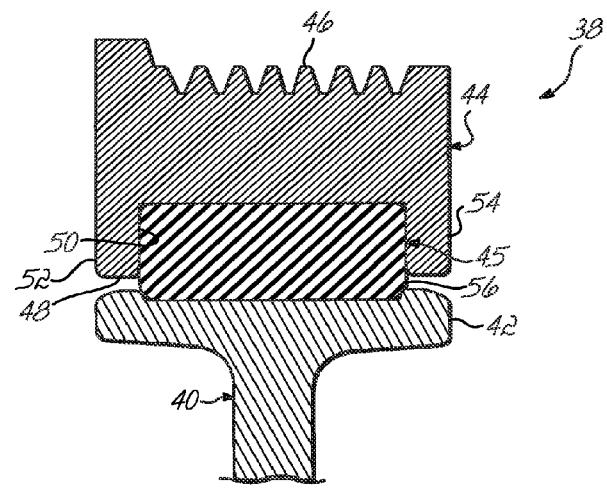
FIG. 2 is a partial cross sectional view of an alternate embodiment of the present invention.

In order to achieve such slip torque with such low compression, about 20% of the elastomer ring 16 must be within channel 20. The elastomer in channel 20 is confined between walls 24 and 26; therefore, it cannot flow. Under compression, the elastomer in channel 20 exerts outward hydrostatic pressure increasing slip torque with minimal compression FIG. 2 shows an alternate embodiment of the crankshaft damper shown in FIG. 1. In this embodiment, the crankshaft damper 38 includes a hub member 40 with an annular peripheral rim 42 and an inertia mass 44 with an elastomeric member 45 between the mass 44 and the hub member 40. The mass 44 includes an exterior surface 46, again designed to engage a serpentine belt, and an interior surface 48 that includes a channel 50.

Elastomeric ring 45 is located in channel 50 between side walls 52 and 54 with a portion 56 of elastomeric ring 45 extending outside of channel 50.

This is assembled basically in the same manner as the crankshaft damper 10 with the elastomeric ring or strip 45 positioned within the channel 50 of the inertia mass 45. Ring or strip 45 is compressed and mass 44 forced onto the annular peripheral rim 42 of hub 40, providing a crankshaft damper.

Figure 3:
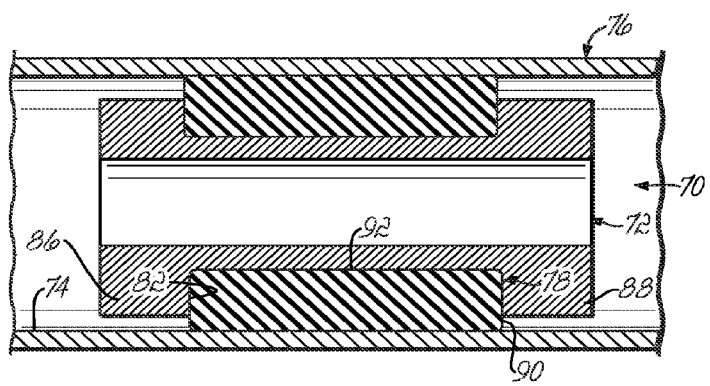
FIG. 3 is a cross sectional view of a second embodiment of the present invention.

The present invention can also be incorporated into a drive shaft damper. As shown in FIG. 3, the drive shaft damper 70 includes a tubular mass 72 positioned within and affixed to the interior surface 74 of a hollow drive shaft 76 with an elastomeric ring 78 between mass 72 and interior surface 74.

Mass 72 includes an exterior circumferential channel 82. Channel 82 includes first and second side walls 86 and 88 with a rubber member 78 positioned within the channel 82 filling the entire channel from side wall 86 to side wall 88. A small portion 90 of the rubber member 78 extends above the exterior surface 80 of mass 72, with a portion 92 of rubber member 78 located within the channel 82.

To form the drive shaft damper 70, preformed elastomeric ring or strip 78 is positioned inside channel 82 and compressed and inserted into the interior of drive shaft 76. Elastomeric ring 78 can be continuous or a strip wrapped around channel 82.

Figure 4:
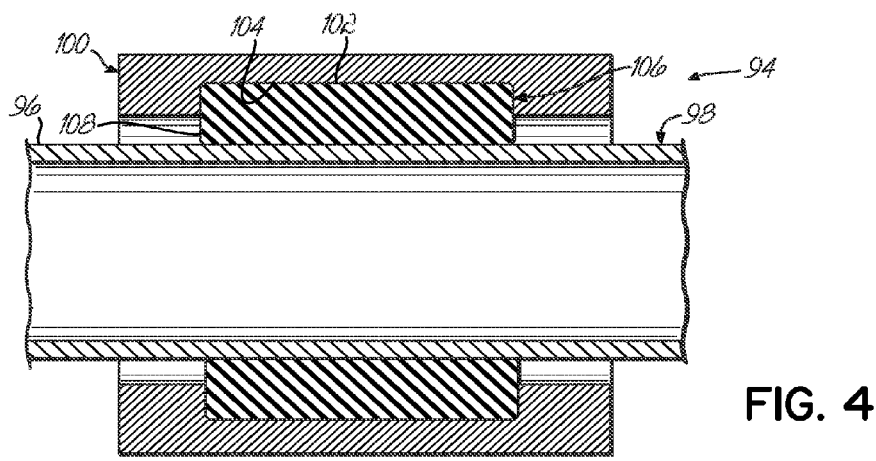
FIG. 4 is a cross sectional view broken away of a third alternate embodiment of the present invention.

An alternate drive shaft damper 94 is shown in FIG. 4. The damper 94 is affixed to the exterior surface 96 of drive shaft 98. It includes an inertia mass 100 having an internal surface 102. The internal surface 102 includes an annular channel 104. An elastomeric ring or strip 106 is located in channel 104 with a portion 108 of elastomeric member 106 located between the exterior surface 96 of drive shaft 98 and the mass 100.

Again, to assemble the damper 94, the elastomeric ring or strip 106 is positioned in the annular channel 104 and compressed and forced over the exterior surface 96 of drive shaft 98. The compressive force maintains the damper 94 in position providing the requisite slip torque.

In all these embodiments, the thickness of the particular elastomeric member, as well as the relative percentage of the elastomeric member located within the channel and outside the channel is a matter of design. Preferably, only about 15-25% of the elastomeric member will be located beyond the outside of the channel. The thickness of the elastomeric member is, again, a matter of design preference. Generally, these will be from about 5 to about 10 millimeters thick. Again, this will vary based on the application.

The vibration dampers of the present invention, in addition to being very versatile, provide many different advantages. With respect to the crankshaft damper in particular, the use of the channel actually provides mass savings in the hub. With all the embodiments, slip torque can be significantly increased while lowering the strain on the rubber. Also, the rubber metal interface in the channel can be left unfinished.

This has been a description of the present invention along with the preferred method of practicing the present invention. However, the invention itself should only be defined by the appended claims.

What is claimed is:

1. A drive shaft torsional vibration damper comprising;
   a tubular inertia mass having an annular channel that includes opposing first and second side walls,
   a preformed elastomeric member, wherein at least 20% of said elastomeric member is located in said annular channel with a portion of said elastomeric member extended beyond said channel, said elastomeric member in continuous contact and compressed against a surface of a drive shaft less than 10% such that said elastomeric member exerts a compressive force against said surface of said drive shaft to maintain said drive shaft torsional vibration damper in position and provide a requisite slip torque, said elastomeric member having an interior surface and an exterior surface, which are generally concentrically oriented with respect to one another, and having opposing side surfaces;
   wherein said elastomeric member has a portion of each of said opposing side surfaces bounded by said first and second side walls of said annular channel.

2. The drive shaft damper claimed in claim 1 wherein said annular channel is on an exterior surface of said tubular inertia mass and said tubular inertia mass is positioned inside said drive shaft.

3. The drive shaft damper claimed in claim 1 wherein said annular channel is located on an interior surface of said tubular inertia mass and said elastomeric member is compressed against an exterior surface of said drive shaft.

4. The drive shaft damper claimed in claim 1 wherein said elastomeric member is compressed less than 8%.

\* \* \* \* \*